United States Patent [19]

Peters

[11] Patent Number: 4,574,459

[45] Date of Patent: Mar. 11, 1986

[54] EXTRUSION DIE MANUFACTURE

[75] Inventor: Donald C. Peters, Savona, N.Y.

[73] Assignee: Corning Glass Works, Corning, N.Y.

[21] Appl. No.: 666,911

[22] Filed: Nov. 5, 1984

Related U.S. Application Data

[63] Continuation-in-part of Ser. No. 564,687, Dec. 23, 1983, abandoned.

[51] Int. Cl.$^4$ .......................... B29F 3/04; B23P 15/16
[52] U.S. Cl. ................................ 29/527.4; 76/107 R;
 29/460; 29/557; 29/558; 425/462; 425/464
[58] Field of Search ...................... 29/557, 558, 527.2,
 29/527.1, 527.4, 460; 425/464, 465, 466, 467,
 462, 461, 463; 76/107 R

[56] References Cited

U.S. PATENT DOCUMENTS

| | | | |
|---|---|---|---|
| 4,235,583 | 11/1980 | Reed | 29/527.2 |
| 4,290,743 | 9/1981 | Suzuki | 29/558 |
| 4,373,895 | 2/1983 | Yamamoto et al. | 29/558 |
| 4,486,934 | 12/1984 | Reed | 29/558 |

*Primary Examiner*—Howard N. Goldberg
*Assistant Examiner*—Vernon K. Rising
*Attorney, Agent, or Firm*—C. S. Janes, Jr.

[57] ABSTRACT

This invention relates to a method for forming a die for use in fabricating a ceramic honeycomb monolith structure having passages separated by walls having predetermined thicknesses. The method involves forming slots in the die and then applying a uniform coating of iron boride, chromium carbide, aluminum oxide, titanium carbide, titanium nitride or titanium carbonitride to the slot-defining surfaces of the die through CVD, the coating ranging in thickness up to 30 microns and being controlled in thickness to ±1 micron.

6 Claims, No Drawings

EXTRUSION DIE MANUFACTURE

This application is a continuation-in-part of application Ser. No. 564,687, filed Dec. 23, 1983, and now abandoned.

BACKGROUND OF THE INVENTION

Ceramic honeycomb structures consisting of a plurality of cells or passages separated by thin walls in parallel relationship to the longitudinal axis of the structures with, in some instances, discontinuities extending transversely through those walls are well known to the art. Such units have seen extensive service as filters for fluids, in heat exchangers, as substrates in various chemical processes, and, more recently, the walls of those bodies have been coated with a catalyst capable of transforming noxious fumes from the discharge gases emanating from internal combustion engines and wood-burning stoves into innocuous components. Those monolithic structures have customarily been fabricated via extrusion.

U.S. Pat. No. 4,235,583 is directed to forming extrusion dies for use in making such honeycomb structures. As was explained therein, the walls of the dies, conventionally prepared from steel, were worn away rather rapidly due to the high pressures encountered in the extrusion process and abrasion from the ceramic particles being extruded. As a result it was commonplace for the die to be replaced after a relatively short service life because the slots therein had become so worn that the wall sections of the ceramic monolith produced were thicker than desired. The method of the patent accomplished three main objectives: it provided means for significantly extending the service life of the dies; it enabled the slot dimensions to be reconstructed to permit the dies to be reused; and it allowed the cutting of the dies to be undertaken utilizing forming techniques requiring less criticality in control and of less expense.

The crux of the patented method lay in cutting the slots in the extrusion or forming end of the die larger than the desired wall thickness of the passages in the monoliths, and thereafter electroless plating the slot-defining surfaces of the die with nickel, chromium, cobalt, or cobalt-nickel to obtain a slot width corresponding to the desired wall thickness. The resultant coating not only provides a harder, more wear-resistant surface than the steel substrate, thereby permitting longer extrusion campaigns, but also, where the coating reaches the point of excessive wear, it may be stripped away from the die surface and the die replated to its original slot width. This latter feature makes possible repeated use of the die.

The capability of building up the slots through electroless plating served two valuable and related purposes. First, it enabled the cutting of the die to be undertaken by means of less expensive, less sophisticated forming techniques. For example, a whole gamut of operable cutting techniques can be considered including electrical discharge machining, wire cutting, milling, wheel grinding, laser cutting, and electron beam cutting. Second, it permitted the production of very narrow slots which could only be machined to specification with great difficulty and control.

Whereas those coatings resulting from electroless plating of the basic steel dies did, indeed, markedly increase the service life of the dies, harder and more wear-resistant coatings have been sought to make possible longer extrusion campaigns before replacement of the coating becomes necessary. Ceramic honeycomb monoliths vary widely in structure. For example, for use in the exhaust stacks of electric power generating stations, catalyst-coated monoliths having as few as 5 parallel passages per square inch with wall thicknesses of about 0.060" and greater can be employed. The particulate material in the exhaust gases passes out through the passages while the catalyst acts upon the $NO_X$ and $SO_X$ components of the gases. In contrast, ceramic honeycomb monoliths are currently being utilized commercially in catalytic conversion units for automobiles which have 400 parallel passages per square inch with consequent wall thicknesses of less than about 0.008", and monoliths having as many as 1500 passages per square inch and wall thicknesses of about 0.003" for use in heat regenerator units have been predicted. Therefore, a deposition technique providing greater control than is possible with electroless metal plating in building up such coatings was demanded in order to insure coatings of precise uniformity in thickness.

Accordingly, the principal objective of the present invention is to produce an extrusion die for forming ceramic honeycomb monoliths wherein the slot-defining surfaces of the die are covered with a coating that is much harder and more wear-resistant than can be achieved through electroless metal plating of nickel, chromium, cobalt, cobalt-nickel, or nickel with abrasion-resistant particles such as SiC and $Al_2O_3$, and wherein the method of applying that coating makes possible greater uniformity in the thickness of the coating than can be accomplished by means of electroless plating.

A specific objective of the present invention is to provide such an extrusion die for forming ceramic honeycomb monoliths having at least 400 parallel passages per square inch with wall thicknesses of less than about 0.008".

SUMMARY OF THE INVENTION

I have found that the above objectives can be attained through the chemical vapor deposition (CVD) of a coating selected from the group of iron boride, chromium carbide, aluminum oxide, titanium carbide, titanium nitride, and titanium carbonitride on the slot-defining surfaces of the extrusion die; the most preferred coating consisting of titanium carbonitride. CVD is a process known to the art and involves chemical reactions taking place in the gaseous phase. Thus, CVD technology comprehends the passing of solids in the gaseous phase over the heated surface of a work piece, the required reaction therebetween occurring thereat. In surface metallurgy the reaction products form a molecular bond with the substrate which intrinsically provides good adhesion.

In general, it is preferred that the above coatings not exceed a thickness of about 20 microns, although coatings having thicknesses of up to about 30 microns are operable. Because of their high degree of hardness and their low coefficient of friction, the specific wear resistance of the coatings is so great that exceptional service life can be obtained with a minimal layer thickness.

The elastic properties of the thin coatings, as determined through bend tests, are quite different from those exhibited by a solid body of the same hard material. Hence, the micron-thick layers evidence a wide range of elastic deformation, whereas solid bodies of the materials break in a brittle fashion at low deformation levels.

An extrusion die suitable for fabricating a ceramic honeycomb monolith having at least 5 passages per square inch separated by walls having thicknesses of about 0.060" and greater in parallel relationship to the longitudinal axis of the structure can be fabricated by forming slots in the die and then applying, through CVD, a uniform coating selected from the group of iron boride, chromium carbide, aluminum oxide, titanium carbide, titanium nitride, and titanium carbonitride to the slot-defining surface of the die, that coating ranging in thickness up to about 30 microns, preferably less than 20 microns, and being controlled to a thickness of about ±1 micron. Where desired, a sequence of superposed layers of different compositions may be deposited. Uniformity in thickness and in surface texture is of vital significance in assuring even wear of the coating in service. In contrast, the thickness of coatings developed through electroless metal plating cannot practically be controlled to better than ±2.5 microns.

Although not so critical in monoliths containing relatively few parallel passages per square inch, where the monolith will contain a great many parallel passages per square inch, with the consequent requirement for very thin wall thicknesses, slots having a width greater than the desired predetermined wall thickness of those passages will, of necessity, be formed in the die, and the CVD coating applied thereto in a thickness designed to obtain a slot width corresponding to the desired wall thickness.

I have found that CVD coatings of the above-cited compositions demonstrate wear resistance much improved upon that exhibited by electroless plated nickel of equivalent thickness and can be re-applied. Finally, although the CVD-coated dies manifest a somewhat higher coefficient of friction than nickel-plated counterparts, because of the higher surface hardness of the CVD coatings, not only do those coatings demonstrate longer wearing capabilities but also permit extrusion rates comparable to and in excess of those operable with nickel coatings.

In general, the combination of wear resistance and rate of extrusion improves with CVD coatings in the following order: iron boride, chromium carbide, aluminum oxide, titanium carbide, titanium nitride, and titanium carbonitride. Titanium carbide demonstrated the best wear resistance, but its coefficient of friction reduced the rate at which the ceramic could be extruded therethrough. In contrast, titanium nitride exhibited a slippery surface, allowing very rapid extrusion, but its resistance to wear was not as great as that of titanium carbide. It appears that titanium carbonitride [Ti(C,N)] possesses the optimum combination of wear resistance and coefficient of friction.

DESCRIPTION OF PREFERRED EMBODIMENTS

The following table provides comparison data utilizing steel dies suitable for fabricating ceramic monoliths having 400 parallell passages per square inch separated by walls having thicknesses of about 0.0070". The die slots were initially cut to about 0.008" via electrical discharge machining, and then the slot-defining surfaces of one die nickel plated, employing electroless plating; the slot-defining surfaces of a second die coated with electroless nickel containing SiC particles; and the slot-defining surfaces of a third die coated with Ti(C,N) by means of CVD. The material extruded was a standard cordierite refractory composition marketed by Corning Glass Works, Corning, N.Y., under Code 9475 for use as a substrate for a catalytic converter unit in automobile exhaust systems.

TABLE

| Coating | Pressure (psi) | Rate of Extrusion (in/min) | Diameter of Part | Length of Part Before Die Repair |
| --- | --- | --- | --- | --- |
| Nickel | 3200–3600 | 6"/sec. | ~9.25" | ~1,000' |
| Nickel + SiC | 3200–3600 | 6"/sec. | ~9.25" | ~7,000' |
| Ti(C,N) | 3200–3600 | 6"/sec. | ~9.26" | ~18,000' |

The tabulated results clearly illustrate the apparent advantages flowing from the use of Ti(C,N) coatings compared with nickel coatings, and even nickel coatings containing SiC particles to improve the abrasion resistance thereof. Thus, the Ti (C,N) coating can yield a die life more than twice that provided by the nickel +SiC particle coating, and up to 20 times that of the nickel coating. The fact that a much longer extrusion campaign can be pursued before the coating requires replacement obviously imparts a very substantive and economic advantage.

I claim:

1. A method for forming an extrusion die suitable for fabricating a ceramic honeycomb monolith structure having separated walls of predetermined thicknesses in parallel relationship to the longitudinal axis of said structure by forming slots in the die, and then applying a uniform coating selected from the group of iron boride, chromium carbide, aluminum oxide, titanium carbide, titanium nitride, and titanium carbonitride to the slot-defining surfaces of the die through chemical vapor deposition, that coating ranging in thickness up to about 30 microns and being controlled in thickness to ±1 micron.

2. A method according to claim 1 wherein said coating ranges less than about 20 microns in thickness.

3. A method according to claim 1 wherein said ceramic honeycomb monolith structure has at least 400 passages per square inch separated by walls having thicknesses of less than 0.008".

4. An extrusion die suitable for fabricating a ceramic honeycomb monolith structure having separated walls of predetermined thicknesses in parallel relationship to the longitudinal axis of said structure, said die consisting essentially of steel, the slot-defining surfaces thereof having a uniform coating thereon ranging in thickness up to 30 microns and being controlled in thickness to ±1 micron selected from the group of iron boride, chromium carbide, aluminum oxide, titanium carbide, titanium nitride, and titanium carbonitride.

5. An extrusion die according to claim 4 wherein said coating ranges less than about 20 microns in thickness.

6. An extrusion die according to claim 4 wherein said coating consists of at least two superposed layers of different composition.

* * * * *